Dec. 9, 1930.  C. T. CABRERA  1,784,132
FILTRATION SYSTEM
Filed July 9, 1928
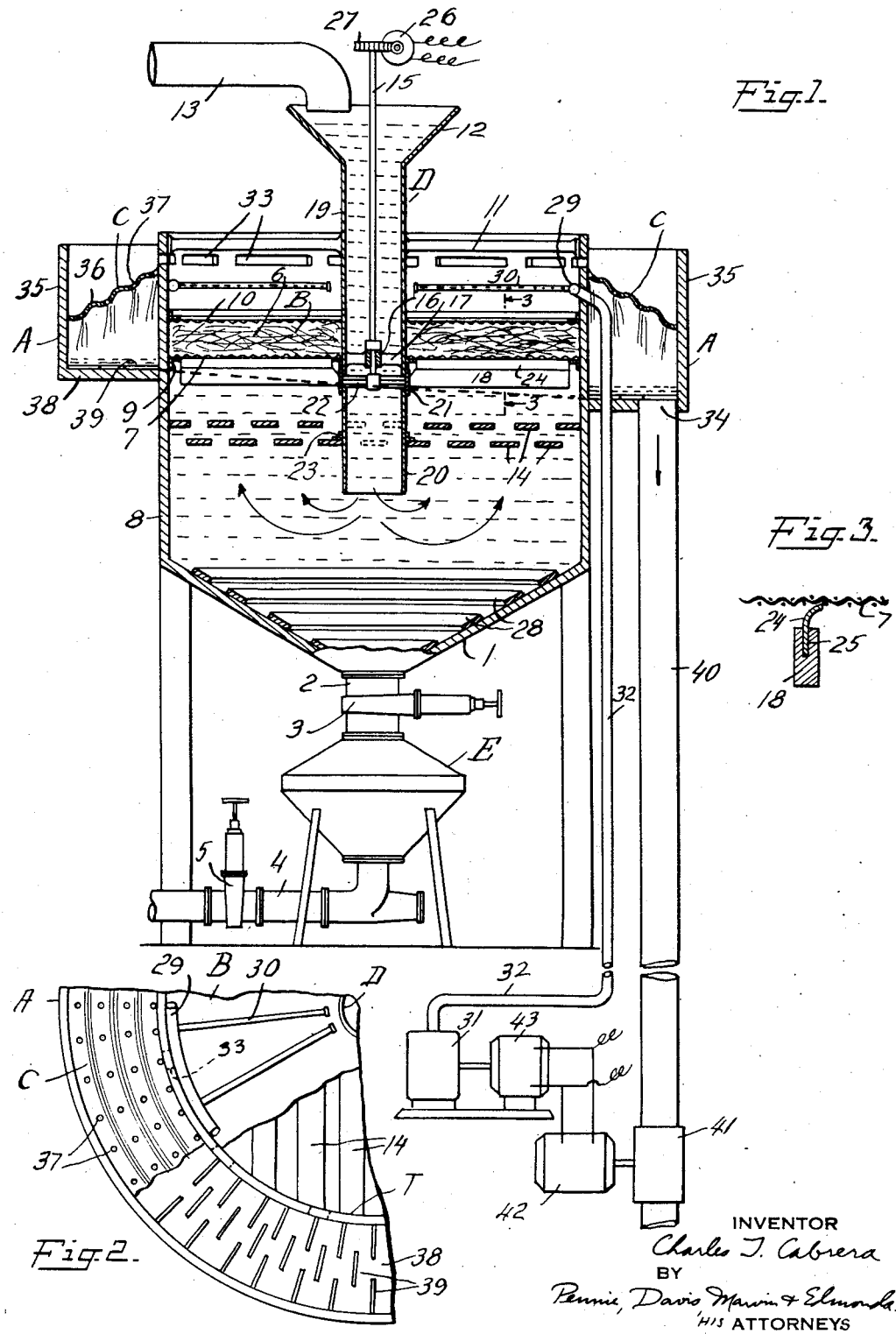

Patented Dec. 9, 1930

1,784,132

UNITED STATES PATENT OFFICE

CHARLES T. CABRERA, OF NEW YORK, N. Y., ASSIGNOR TO ELECTRO DIALYZER CORPORATION, OF NEW YORK, N. Y., A CORPORATION OF NEW YORK

FILTRATION SYSTEM

Application filed July 9, 1928. Serial No. 291,237.

This invention relates to a filtration system, and more particularly concerns improved and unitary apparatus for subjecting a solid laden liquid to settling, filtering and activating treatments.

Many solid laden liquids, such as sewage, and various waste liquids from pulp and textile mills and from canning and other industrial plants must be subjected to some form of treatment for the removal of the soluble and insoluble solids therefrom. It is often desirous or essential, particularly in the treatment of sewage, that very large quantities of the solid laden liquid be continuously treated, and it is further desirable that this treatment include not only the substantially complete separation of the liquid from the insoluble, colloidal and soluble solids, but also the purification of the effluent liquid to an extent that the putrefaction thereof will be prevented, or at least delayed for a considerable period.

In order to effect a substantially complete separation between the liquid and the solids contained therein, particularly when the solid laden liquid comprises sewage, it is usually desirable to successively subject the liquid to several different treatments. Thus the liquid is usually first allowed to stand or flow slowly through suitable containers to permit the sedimentary solids to settle out, and is subsequently passed through suitable filter beds to strain the remaining solids therefrom. The effluent liquid from the filter bed is then subjected to a purifying treatment such as aeration to prevent or delay the putrefaction thereof.

The known apparatus for carrying out these successive treatments is unsatisfactory in various respects. The filter beds previously employed for straining the solids from the liquid vehicle do not remove the soluble or colloidal solids to a sufficient extent, and the insoluble solids quickly clog the interstices thereof, thereby undesirably reducing the liquid flow therethrough. Further, the known forms of clarification apparatus are very large and necessitate the construction of plants occupying considerable area, and for this reason are unsuited for use in congested communities.

With the above and other considerations in mind, it is proposed in accordance with the present invention to provide a compact and unified device including apparatus for successively subjecting solid laden liquids to sedimentation, filtration, and aeration or purification treatments. More specifically, it is proposed to provide a device of this character in which the various treatments are effectively and rapidly carried out, and in which at least a portion of the power for operating apparatus for cleaning the filtering means and for supplying the aerating fluid is derived from the gravitational flow of the effluent liquid.

Various other specific objects, advantages and characteristic features of the invention will be pointed out or will become apparent as the description thereof progresses.

In general, the objects of the present invention are carried out by causing the solid laden liquid to flow upwardly at a low velocity through a specially designed filter bed, the container below the bed acting as a sedimentation tank and being provided with specially arranged baffles or other means for promoting both sedimentation and coagulation of colloidal matter. The liquid effluent, after passing through the filter bed, is purified by passing a spray of air, oxygen or other fluid therethrough, and is further aerated by direct contact with the atmosphere in a specially constructed aeration trough which is directly connected to and forms a part of the sedimentation and filtration container. Suitable power generating means are operated by the gravitational flow of the effluent liquid from the aeration trough and the power thereby derived is employed to supply oxygen, air or other fluids to the effluent as it emerges from the filter bed, and to operate means for continuously scraping or cleaning the lower surface of the filter bed.

In describing the invention in detail, reference will be made to the accompanying drawings, in which;

Figure 1 is a side elevation, partly in section, of the liquid clarification apparatus of the present invention, and a diagrammatic representation of the power generating means employed in connection therewith;

Fig. 2 is a plan view, partly in section, of the clarification device illustrated in Fig. 1; and Fig. 3 is a sectional view taken along the line 3—3 of Fig. 1, and viewed in the direction of the arrows.

Referring to the drawings, and particularly to Fig. 1, the embodiment of the invention disclosed herein comprises generally a circular tank or container T having a tapered or conical bottom wall 1. A sludge outlet pipe 2 communicates with the lower apex of the bottom wall 1, this pipe being preferably provided with a cut off valve 3. An ejector E is connected to the pipe 2, and is in turn connected to a discharge pipe 4 provided with a cut off valve 5. The particular construction of the ejector employed forms no part of the present invention and will not be described herein, it being sufficient to explain that this device operates, with the aid of compressed air or otherwise, to carry the accumulated sludge or sediment away from the bottom of the tank T.

A circular filter bed B extends horizontally across the tank T, and a centrally disposed tubular inlet duct D extends downwardly into the tank through the filter bed B as shown. The filter bed may be composed of any suitable material and preferably takes the form of a massed filtering medium 6 supported on a screen or grid 7 of suitable mesh which is connected to the cylindrical wall 8 of the tank by suitable means such as the brackets 9. A second screen or grid 10 is suitably secured over the upper surface of the filtering medium 6, and serves to maintain this material at the proper degree of density and to prevent the dislodgment thereof by the flow of liquid therethrough. The filtering medium 6 may comprise finely divided metallic strands compacted into intimate relation as described in my copending applications Serial No. 233,497, filed November 15, 1927, and Serial No. 282,217, filed June 1, 1928, or any other suitable substances may be employed for this purpose.

The inlet duct D is supported within the tank T by means of suitable braces 11, as shown. The lower end of the duct D extends a considerable distance below the lower surface of the filter bed B for a purpose which will be hereinafter described. A funnel shaped hopper 12 is provided at the upper end of the inlet duct D and the liquid to be filtered is conducted to this hopper through a pipe 13. A series of staggered baffles 14 are disposed horizontally across the tank T at a point spaced from the lower surface of the filter bed B and above the lower end of the inlet duct D. These baffles preferably comprise two parallel rows of spaced flat beams or strips of wood or other suitable material, the strips of each row being arranged in overlapping relation with respect to the adjacent strips of the other row, as shown in Figs. 1 and 2.

A vertical shaft 15 is suitably journaled within the duct D in a thrust bearing 16 carried by a bracket 17 fixed on the inner wall of the duct. A pair of radially extending scraper arms 18 are connected to the lower end of the shaft 15, these arms extending outwardly just below the screen 7 which supports the filter bed B and terminating adjacent the cylindrical wall 8 of the tank T. The inlet duct D is suitably constructed to permit the rotation of the radial scraper arms 18 by the shaft 15. In the embodiment disclosed, the duct D comprises an upper section 19 and a lower section 20 spaced a short distance apart, and a sleeve 21, rotatably engaging the upper and lower sections 19 and 20 bridges the gap therebetween. The sleeve 21 is connected to the lower end of the shaft 15 by means of a spider 22, and the radial scraper arms 18 may comprise extensions of the spokes of this spider, or may be suitably secured to the outer surface of the sleeve 21 as desired. The lower section of the duct D is suitably supported by brackets 23 fixed to the baffles 14 or otherwise suitably supported. With the arrangement described, the shaft 15 together with the sleeve 21 and the scraper arms 18 may be rotated while the upper and lower sections 19 and 20 of the duct D remain stationary Suitable scrapers comprising upwardly extending strips 24 of flexible material such as rubber are secured to the upper edges of the arms 18 respectively, these scrapers being arranged to bear against the lower surface of the screen 7 which supports the filter bed B. The scrapers 24 may be secured to the arms 18 in any suitable manner, and a shown, are retained within slots 25 in the upper edges of the arms, as clearly shown in Fig. 3. The shaft 15, together with the scraper arms 18, secured thereto, is slowly rotated by a suitable source of power such as the electric motor 26 connected to the shaft 15 through a speed reducing gear train 27. The electric energy for operating the motor 26 is supplied as hereinafter described.

The inner surface of the conical bottom wall 1 of the tank T is provided with a plurality of spaced concentric protruding barriers or riffles 28 for promoting the coagulation of the colloidal solids as hereinafter more fully explained. These barriers may comprise cleats of wood or other suitable material attached to the bottom of the tank in any suitable manner.

Suitable means are provided for injecting air, oxygen or any other suitable purifying fluid to the liquid effluent above the filter bed B. In the embodiment disclosed, an air manifold 29 extends around the cylindrical wall 8 of the tank T, and a plurality of inwardly extending radial pipes 30 are connected to the manifold 29 as shown. The radial air pipes 30 may be formed of porous material, or may be perforated or otherwise designed to permit the flow of an aerating or oxygenating fluid therethrough. The manifold 29 is supplied with air or any other suitable fluid from a compressor 31 through a pipe 32 as shown.

A plurality of elongated outlet openings or slots 33 are provided in the cylindrical wall 8 of the tank T, as shown in Fig. 1, and a circular aerating and discharge trough A is suitably secured to the tank beneath these outlet openings as shown. The trough A extends entirely around the tank T and is inclined at a suitable angle to cause the effluent liquid to flow therein through a single discharge opening 34. A perforated and corrugated chute C is disposed over the top of the circular trough A, this chute being inclined at a suitable angle and extending from the lower edges of the liquid outlet openings 33 to the outer wall 35 of the trough A at a point below the upper edge thereof. The corrugations or riffles 36 in the chute C preferably comprise concentric ridges thereon and the perforations 37 therethrough are uniformly distributed over the surface of the chute.

The bottom wall 38 of the trough A is provided with a continuous series of staggered ridges, cleats or riffles 39. These ridges are arranged in overlapping relation and are of sufficient height to agitate and partially aerate the liquid effluent as it flows through the trough.

A system of the type described is usually so located that the solid laden liquid flows to the inlet duct thereof by gravity, and the filtered liquid or effluent also flows by gravity to a river, harbor, lake or other body of water. In accordance with the present invention, the gravitational flow of the liquid effluent from the clarification apparatus to the disposal level is utilized to generate power for compressing the aerating fluid and for operating the filter scraping apparatus. In the embodiment of the invention disclosed herein, a discharge pipe 40 is connected to the outlet opening 34 of the trough A, and a hydraulic turbine or water wheel, conventionally illustrated at 41, is connected to the discharge pipe 40 at a point just above the level of the body of water into which the treated liquid is finally discharged. The water wheel 41 is preferably arranged to operate an electric generator 42 and the energy so obtained is employed to operate a motor 43 which drives the air compressor 31. The electric energy from the generator 42 is further employed to operate the motor 26 which drives the shaft 15 and the scraper arms 18. Thus the energy derived from the hydraulic head of the discharged effluent is employed to operate means for cleaning the filter and aerating the filtered liquid.

The operation of the disclosed embodiment of the present invention will now be described. The sewage or other solid laden liquid is supplied to the inlet duct D through the pipe 13 and the hopper 12, and this liquid fills the tank T and flows upwardly from the lower end of the duct D as generally indicated by the arrows. Due to the sudden increase in the cross section of the liquid channel as the liquid enters the tank, the velocity of the liquid flow is greatly reduced, and the velocity of the liquid is still further reduced by the baffles 14 as the liquid flows therethrough. Due to this reduction in the flow velocity, a large proportion of the sedimentary solids settle from the liquid to the bottom of the tank T. As the liquid flows upwardly through the staggered baffles 14, the direction of flow thereof is partially reversed, and due to this action, as well as to the contact of the liquid with the baffles, some of the organic colloidal substances carried by the liquid coagulates on the baffles and fall therefrom to the bottom of the tank. The coagulation of the colloidal matter in the lower portion of the tank T is further promoted by the masses of previously coagulated material which collect on the bottom of the wall 1 of the tank T and are held by the cleats or barriers 28. It has been found that such masses of coagulated material act to impound or entrap colloids from the liquid with the result that the coagulation within the lower portion of the tank T is greatly accelerated.

The solid laden liquid flows upwardly into the filter bed B and passes through the filtering medium 6, wherein substantially all of the remaining solids are extracted therefrom. The liquid effluent rising from the filter bed is aerated or oxygenated by air, oxygen or any other suitable fluid flowing from the air pipes 30 and bubbling up through the liquid. In this manner, at least a portion of the oxygen necessary to prevent or delay the putrefaction of the effluent is supplied thereto.

The effluent flows from the tank through the outlet openings 33 on to the chute C in the trough A, drips through the perforations 37 in this chute and falls on to the bottom wall 38 of the trough. As the effluent runs down the chute C it is agitated by the corrugations 36 thereon, and this agitation as well as the dripping of the effluent from the chute to the trough, permits the atmospheric aeration of the effluent. Further atmospheric aeration is provided by the agitation of the liquid as it passes over the staggered riffles or extensions 39 on the bottom wall 38 of the trough A.

The effluent liquid flows along the bottom of the inclined trough A, through the outlet opening 34 and into the discharge pipe 40. The liquid flowing downwardly through the discharge pipe enters the water wheel or turbine 41 under a head of several feet, and the water wheel is operated by this liquid and drives the generator 42. The electric current from the generator is conducted to the motor 43 which drives the compressor 31, and is also conducted to the motor 26 which drives the scraper arms 18. If desired, suitable controlling and switching devices may be included in the energizing circuits of the motors 43 and 26, whereby the speed thereof may be regulated and electric current from an independent source may be delivered thereto.

During the operation of the device, considerable colloidal matter and other solids collect and coagulate on the lower surface of the screen 7 below the filter bed B. This material is continuously dislodged from the screen by the scraping blades 24 which are continuously wiped across the lower face of the screen by the rotation of the scraper arms 18. The coagulated material and other solids so dislodged gradually settle to the bottom of the tank T.

During the filtration process, the cut off valve 3 in the outlet pipe 2 is open and the valve 5 in the pipe 4 below the ejector E is closed. The solids which coagulate and settle from the liquid within the lower portion of the tank T, as well as the solids filtered from the liquid and scraped from the screen 7 by the scraping device, settle to the lower apex of the tank and fill the ejector and the pipe 2. After this sludge has reached a level considerably above the upper end of the outlet pipe 2, the valve 3 is closed, the valve 5 is opened, and the ejector E is operated to remove the sludge therefrom through the pipe 4. Since the sludge is permitted to build up to a considerable depth within the tank T before the ejector E is operated, the sludge within the ejector is compressed to a considerable extent by the weight of the column of the sludge within the tank T, and a considerable quantity of liquid is thereby extracted from each charge of sludge before it leaves the ejector. The ejecting operation is repeated at suitable intervals as the filtration process continues.

From the description given, it will be readily apparent that the clarification apparatus of the present invention incorporates many advantageous features. Due to the provision of the baffles 14 and the retaining barriers 28 in the tank T below the filter bed, a large percentage of the colloidal solids are coagulated and extracted from the liquid before it enters the filter bed, and the settling out of the sedimentary solids is accelerated by the settling masses of colloidal matter. The continuously operating scraper arms 18 with their flexible blades 24 keep the lower surface of the filter bed clear of filtered solids and so prevent the rapid clogging of the filter bed. At least a portion of the oxygen necessary to properly aerate and purify the effluent is supplied thereto in the tank T from the compressor 31, and the energy expended in supplying this oxygen, as well as the energy for operating the scrapers, is economically derived from the discharging stream of filtered liquid. The aerating trough A is designed to agitate and spray the effluent and thus expose it to the action of the atmosphere, whereby further aeration thereof is effected.

Although the clarification apparatus of the present invention has been described in connection with a single specific embodiment, it should be understood that the invention is not limited to the specific arrangement and construction herein disclosed. For example, the shape and arrangement of the tank T and the aeration trough A may be widely varied, the compressor 31 and the scraper apparatus may be operated directly by the water wheel, and various other changes, modifications or omissions may be made without departing from the scope of the invention as defined in the appended claims.

I claim:

1. In a device for treating solid laden liquids, a container, a filter bed extending across said container, means for introducing a solid laden liquid to said container below said filter bed, a trough surrounding said container for receiving filtered liquid therefrom, and means in said trough for agitating and aerating the filtered liquid.

2. In a device for treating solid laden liquids, a circular container having a plurality of outlet openings in the side walls thereof, a filter bed extending across said container below said outlet openings, means for introducing a solid laden liquid to said container below said filter bed, an inclined trough surrounding said container below said outlet openings for receiving the filtered liquid therefrom, and means in said trough for agitating and aerating the filtered liquid.

3. In a device for treating solid laden liquids, a container having at least one outlet opening in the side wall thereof, means for introducing a solid laden liquid to said container, means within said container for filtering the solid laden liquid, a trough secured to the outside of said container below said outlet opening, an inclined perforated chute in said trough for receiving the filtered liquid from said outlet opening and means in said trough for agitating the filtered liquid as it flows therethrough.

4. In a device for treating solid laden liquids, a circular container, a circular filter bed extending across said container, a vertical inlet duct extending through said filter bed for introducing a solid laden liquid to said container below said filter bed, a plurality of radial scraper arms supported by said inlet duct and engaging the lower surface of said filter bed, and means for continuously moving said scraper arms over the lower surface of said filter bed.

5. In a device for treating solid laden liquids, a container having an inclined bottom wall, a filter bed extending across said container, means for introducing a solid laden liquid to said container below said filter bed, and at least one riffle on the inclined bottom wall of said container for promoting the coagulation of solids therein.

6. In a device for treating solid laden liquids, a circular container, a circular filter bed extending across said container, a vertical inlet duct extending through said filter bed for introducing a solid laden liquid to said container below said filter bed, said inlet duct being centrally disposed within said container, a plurality of scraper arms extending radially from said inlet duct and engaging the lower surface of said filter bed, and means within said inlet duct for continuously turning said scraper arms.

7. In a device for treating solid laden liquids, a container, means for introducing a solid laden liquid to said container, means within said container for filtering said liquid, means for discharging the filtered liquid from said container and means operated by the flow of discharged liquid from said container for supplying an aerating fluid to the liquid within said container.

8. In a device for treating solid laden liquids, a container, filtering means in said container, means for introducing a solid laden liquid to said container and passing said liquid through said filtering means, means for discharging the filtered liquid from said container, means operated by the flow of discharged liquid from said container for supplying an aerating fluid to the liquid within said container and further means operated by the flow of discharged liquid for cleaning said filtering means.

9. In a device for treating solid laden liquids, a container, a filter bed in said container, means for passing a solid laden liquid through said filter bed, means for cleaning the surface of said filter bed, means for supplying a compressed aerating fluid to the filtered liquid in said container, means for discharging said filtered liquid from said container, and means operated by the flow of said discharged liquid for operating said cleaning means and for compressing said aerating fluid.

10. In a device for treating solid laden liquids, a container, a filter bed extending across said container, means for passing a solid laden liquid upwardly through said filter bed, means for scraping the lower surface of said filter bed, means for conducting a stream of filtered liquid away from said filter bed, power generating means operated by said stream of filtered liquid, and separate means operated by the power generated by said generating means for operating said scraping means and for supplying an aerating fluid to the liquid within said container.

11. In a device for treating solid laden liquids, a container, a filter bed extending across said container, means for passing a solid laden liquid upwardly through said filter bed, means for conducting a stream of filtered liquid away from said filter bed, power generating means operated by said stream of filtered liquid, and means operated by the power generated by said generating means for supplying an aerating fluid to the filtered liquid rising from said filter bed.

In testimony whereof I affix my signature.

CHARLES T. CABRERA.